J. PRINCE.
MILKING MACHINE.
APPLICATION FILED JAN. 24, 1918.
1,358,987.
Patented Nov. 16, 1920.
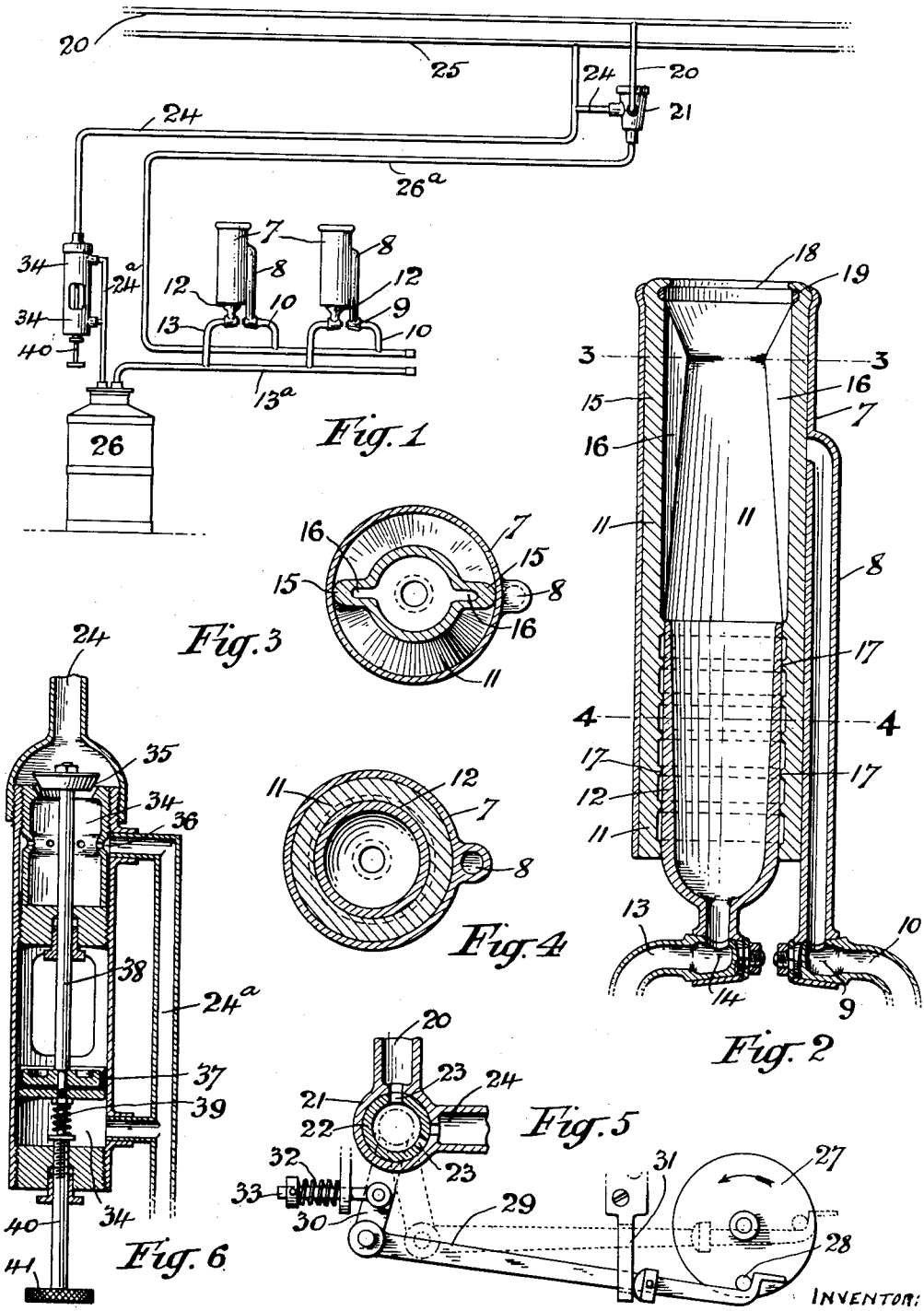

UNITED STATES PATENT OFFICE.

JOHN PRINCE, OF MALANDA, QUEENSLAND, AUSTRALIA.

MILKING-MACHINE.

1,358,987.   Specification of Letters Patent.   Patented Nov. 16, 1920.

Application filed January 24, 1918. Serial No. 213,543.

*To all whom it may concern:*

Be it known that I, JOHN PRINCE, a subject of the King of Great Britain, residing at Malanda, in the State of Queensland, Commonwealth of Australia, sawmiller, have invented certain new and useful Improvements in and Connected with Milking-Machines, of which the following is a specification.

This invention relates to milking machines and appliances connected therewith and has for its object the milking of a cow in a manner to imitate as nearly as possible the manual operation.

In carrying my invention into effect, I provide an improved teat cup wherein a vacuum is maintained within the cup and simultaneously therewith vacuum and air pressures are applied alternately outside and directly upon the pulsator, which forms part of a resilient lining to the cup, the said air pressures and vacuum being applied between the pulsator and the metal casing.

Further, it is an object of my invention to so regulate the degree of vacuum within the cup that it shall be of less intensity than the vacuum applied outside the pulsator. Other improvements consist in the provision of means for controlling and applying the vacuum and air pressures, for regulating the vacuum and for cutting out the same in a self-acting way on the cup becoming detached from a teat.

In the accompanying drawing:

Figure 1 shows a general view of a plant and two teat cups operable therefrom.

Fig. 2 is a longitudinal sectional elevation of a teat cup with the lining and casing.

Fig. 3 is a sectional plan view on the line 3—3 of Fig. 2.

Fig. 4 is a like view on the line 4—4 of Fig. 2.

Fig. 5 shows one form of air and vacuum controlling means, the valve being in section, and Fig. 6 illustrates in longitudinal sectional elevation the control means of the vacuum within the cup.

The teat cup is made with a metal casing 7 to which is connected the air-vacuum pipe 8 that is attached through a cock 9 in to a pipe 10. Within the casing is the pulsator and lining 11 made of a resilient material such as rubber and that is formed with a bell mouth the narrowest part or throat of the bell mouth being on the line 3—3 of Fig. 2, while its internal diameter increases toward its lower end, the increase ceasing about midway of its length where the rubber lining is adapted to entirely fit the casing and to envelop and retain a metal cup 12, called herein the milk cup, that is connected at its lower end with a pipe 13 through a cock 14, said pipe leading to the milk pipe 13ª which is connected into the milk can 26.

The external surface of the pulsator 11 is parallel for the most part with its internal surface except where longitudinal ribs 15 are provided which are immediately opposite the air-vacuum pipe orifice, one of the ribs partly covering the same. The inner surface of the member 11 is provided with two grooves 16 that are coincident with the ribs 15 and which terminate at points at or near the milk cup 12. The grooves 16 are intended to avoid the buckling of the internal resilient surface of the pulsator when the same is subjected to the alternating pressures due to air and vacuum delivered through the pipe 8, the ribs 15 acting somewhat as hinges under the influence of the pulsations.

To facilitate the insertion or removal of the milk cup 12 into or from the member 11 the internal surface of the lower end of the latter is ribbed as at 17, the cup 12 bearing upon the ribs and being held in position thereby. This lower part of the lining may, if necessary, be made of harder material than the upper portion, the walls of the pulsator being just thick enough to adequately respond under the alternations of air pressures and vacuum and at the same time be strong enough to withstand reasonable wear and tear.

The mouth of the pulsator is designed to slightly extend beyond the metal casing 7 so as to provide for a flexible contact with the udder and on the inside it is provided with an annular groove 18 in which a stout wire ring 19 seats, thereby stiffening the neck.

Referring now to Fig. 1, 20 is an air pipe that is connected to an air compressor. It branches to the valve 21, the plug 22 of which is provided with ports 23 which are adapted through suitable mechanism to alternately register with pipe 20 and pipe 24, that is connected into the principal vacuum pipe 25, and permanently with pipe 26ª that leads to the pipes 10 and the air-vacuum pipe 8.

One way of rotating the plug 22 to bring its ports over the said pipes 20 and 24 consists of a disk 27 that is rotated by any suitable means and mounts a stud 28 that, as the disk rotates, engages the curved end of a rod 29 that is connected to a lever 30 attached to the said valve plug. The throw of the member 29 is limited by the slotted bracket 31 and as the disk rotates and 29 is engaged by the pin, the rod and lever are taken to the position indicated by dotted lines in Fig. 5 and the plug is turned to register with the vacuum pipe 24. A spring 32 is confined on a rod 33 attached to lever 30 and as the lever is raised the spring is compressed against a bracket or other equivalent means. When the rod 29 is released from the stud the spring reacts to return the lever to its former position and the plug is promptly returned to register with the air pipe 20. Thus, alternations of air pressures and vacuum occur in the pipe 8 and upon the pulsator to cause same to be first compressed and then released, which produce motions similar to the manual operation of milking if the cow's teat has been inserted in the pulsator of the teat cup. The alternations will come to pipe 8 from the valve plug 22 through pipes 26ª and 10. It will be observed that by means of the parts described the plug 22 registers longer with the air pipe than with the vacuum which is employed merely to release the pressures on the pulsator.

It is important to maintain within the milk cup 12 a vacuum of less intensity than the vacuum outside the pulsator; thus, for satisfactory working I would apply a vacuum of say 15 inches alternately with air pressures of 3 pounds to the square inch more or less on the pulsator, while in the milk cup the vacuum will only be about 8 inches or less. In order to provide for the two degrees of vacuum in the teat cup, I interpose certain controlling means in the shape of a reducing valve in the pipe 24, illustrated in detail in Fig. 6, in which there are two cylinders 34 that are internally connected through a pipe 24ª which is virtually a continuation of pipe 24. In the upper part of the upper cylinder is the valve 35 adapted to close downwardly and in the waist of this cylinder is an annular passage containing perforations 36 leading to said vacuum pipe 24ª. In the lower cylinder is a piston 37 open to the atmosphere on its upper side, while below the piston the vacuum pipe 24ª communicates with the cylinder. The piston is connected to the valve 35 by a rod 38 and the atmospheric pressure on the piston will tend to close the valve while the vacuum above it tends to keep it open. The pressure on the piston will be sufficient to close the valve but if the effect of the pull downward on the piston is reduced and the vacuum is known, the pressure upward upon the valve will be such that the valve will be more or less opened as required by the vacuum in pipe 24 to permit of varying degrees of vacuum to be conveyed through pipe 24ª to can 26. This is effected by a compression spring 39 below the piston the tension of which is regulated by the screwed spindle 40 and milled wheel 41.

This mechanism can thus, by controlling the effect of the atmospheric pressure on the piston 37, be adapted to provide for varying degrees of vacuum in the pipe 24ª and can 26 and thence to the milk cup 12. Further, in the milking of a mixed herd it is necessary to vary the degree of vacuum in the milk cup according to the manner in which a cow lets down the milk. To this end there will be a reducing valve as above described to each stall connected up in the system whereby the degree of vacuum in the milk cup may be regulated according to the facility with which the cow milks. If a cow gives her milk freely less vacuum will be required in the milk cup.

In order that all pressures may be cut off from a teat in a self-acting way when the cup becomes detached from a teat I have provided the cocks 9 and 14 in the pipes 10 and 13 respectively so disposed that when the cup is no longer supported by the teat it will fall over sidewise, thereby turning off the cocks and stopping the operations in the pulsator and milk cup.

There will be four teat cups arranged on suitable supports connected up into the system and when the cow's teats are inserted in the cups and the pressures are applied, there will be a continuous partial vacuum in the milk cup 12 and alternating pressures of air and vacuum about the pulsator. The construction of the pulsator lining of the teat cup casing is such that the successive air pressure thereon will imitate as nearly as possible the operation of milking by hand while the milk flows away continuously through the milk cup and pipes to the can. The pulsator resides in the upper part of the lining 11 while the lower part, which may be made of harder material than the upper portion, either constitutes the milk cup or preferably supports the metal cup 12 as explained. The external ribs 15 and internal grooves 16 will disappear at the point where the pulsator merges into the milk cup.

Having now described my invention what I claim as new and desire to secure by Letters Patent is:—

1. In a milking machine, a teat cup having a metal casing, a flexible lining thereto constituting in its upper part a pulsator and having a bell mouthed portion therein that extends slightly beyond the metal casing, said pulsator portion also having vertical and parallel ribs on the exterior surface and corresponding grooves in the interior surface thereof, a milk cup supported in the lower part of the lining connected with a vacuum pipe, and a pipe attached to the casing adapted to deliver alternations of air pressures and vacuum to the pulsator.

2. In a milking machine, a teat cup having a metal casing, a flexible lining thereto constituting in its upper part a pulsator and having a bell mouthed portion therein that extends slightly beyond the metal casing, said pulsator portion also having vertical and parallel ribs on the exterior surface of the pulsator and corresponding grooves in the interior surface thereof, a milk cup in the lower part of the lining connected with a vacuum pipe, and a pipe attached to the casing adapted to deliver alternations of air pressures and vacuum to the pulsator, a cock in the air-vacuum pipe between the main pipe and the delivery pipe on the teat cup and a like cock on the milk cup vacuum pipe, as specified.

3. In a milking machine, a teat cup having a metal casing, a flexible lining thereto constituting in its upper part a pulsator and having a bell mouthed portion therein that extends slightly beyond the metal casing and is formed with an internal annular groove, said pulsator portion also having vertical and parallel ribs on the exterior surface of the pulsator and corresponding grooves in the interior surface thereof, a stout metal ring in the groove, a milk cup in the lower part of the lining connected with a vacuum pipe, and a pipe attached to the casing adapted to deliver alternations of air pressures and vacuum to the pulsator, a cock in the air-vacuum pipe between the main pipe and the delivery pipe on the teat cup and a like cock on the milk cup vacuum pipe, as and for the purposes specified.

4. In milking machines, a teat cup, pulsators therefor, air pressure and vacuum pipes, a valve connected into each of the pipes and adapted to deliver alternations of air pressures and vacuum to the pulsators, means in the vacuum pipe for regulating the degree of vacuum to the inside of said cups, a milk receptacle connected to the vacuum pipe, a milk pipe from each teat cup to the said receptacle and means for cutting off the vacuum and pressure to a teat cup in a self-acting manner when the same becomes detached from the cow, for the purposes specified.

5. In milking machines, means whereby alternations of air pressures and vacuum are delivered to the pulsator of a teat cup which consist of the combination of a valve body, tubular projections thereon which connect respectively with an air pressure pipe, a vacuum pipe and an alternating air pressure and vacuum pipe, a hollow plug in said body that leads to said air-vacuum pipe, a lever connected to the plug and a curved arm to the lever, a rotary disk, a stud thereon adapted to engage the curved arm as the disk rotates, a spindle on the lever, a spring on the spindle that is compressed when the lever is raised by the rotating disk, and ports in the plug that as the same is moved about its axis come alternately over the air and vacuum pipes, as specified.

6. In milking machines, a milk cup, a teat cup having a metal casing, a flexible lining thereto the lower end of which is formed of a harder material than the upper portion, the more flexible part constituting a pulsator and the lower end a support for the milk cup, a vacuum pipe connected into the milk cup, a pipe connected into the casing and adapted to subject the pulsator to air pressure and vacuum influences, said pulsator having a bell mouth, vertical exterior ribs and corresponding grooves in the interior surface of the same, said surface inclining outwardly from the throat of the bell mouth toward the milk cup where the grooves terminate and the inflations cease to operate, as herein explained.

7. In a milking machine having a milk cup and a milk receptacle, means for controlling the degree of vacuum in a milk cup connected to the milk receptacle which comprises a main vacuum pipe, an upper cylinder and a lower cylinder, a valve in the upper cylinder leading to the main vacuum pipe, a spindle for the valve, a piston in the lower cylinder on the valve spindle open to the atmosphere on its upper side, a pipe connecting the upper cylinder below the valve with the lower cylinder below the piston and leading to the milk receptacle, a compression spring in the lower cylinder bearing on the piston and means for manually adjusting the tension of the spring, as herein set forth.

In testimony whereof I have signed my name to this specification in the presence of two subscribing witnesses.

JOHN PRINCE.

Witnesses:
P. N. NEWTON,
K. SHEEHY.